March 8, 1960 D. J. PYE ET AL 2,927,457
VISCOMETER
Filed Dec. 20, 1956 2 Sheets-Sheet 1

INVENTORS.
David J. Pye
Robert A. Crane

BY Griswold & Burdick
ATTORNEYS

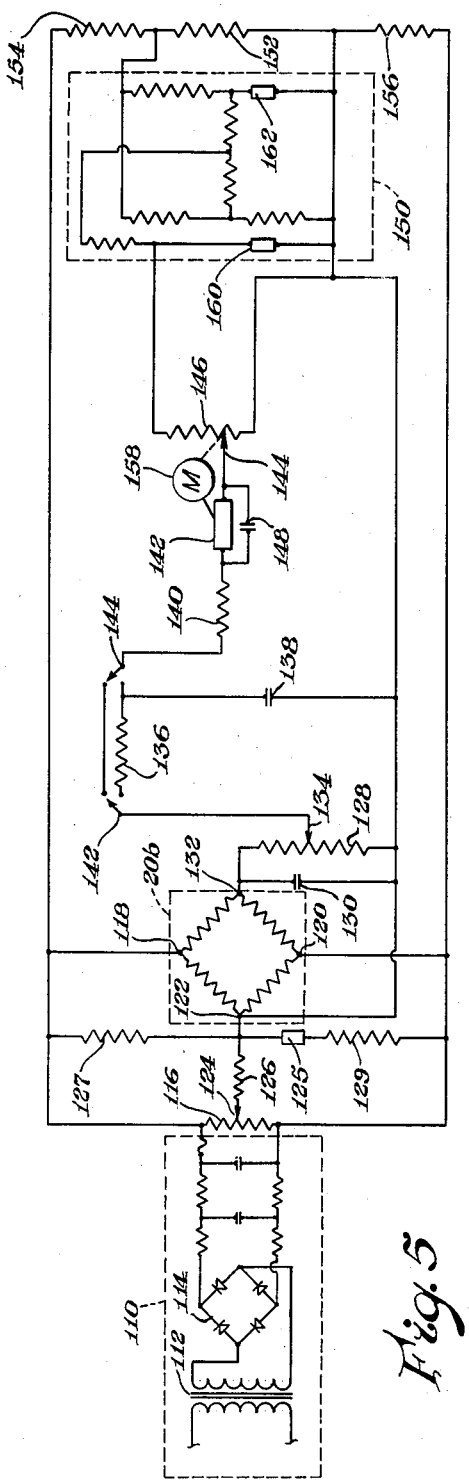
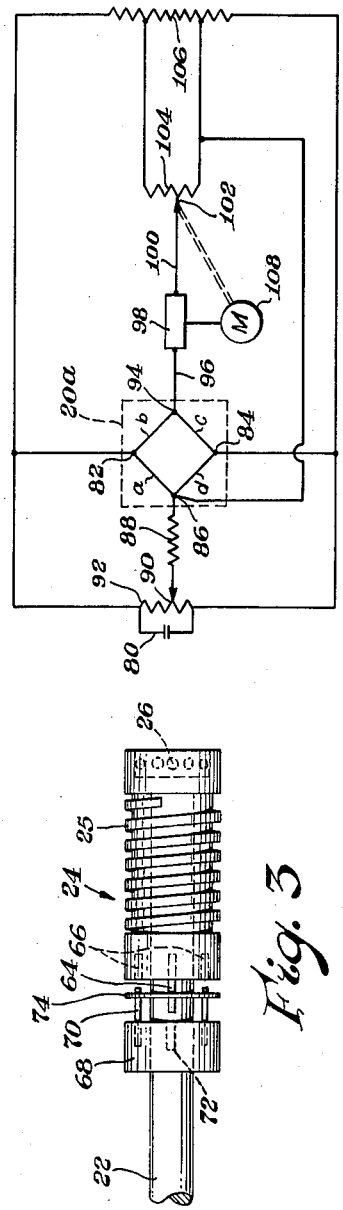
INVENTORS.
David J. Pye
Robert A. Crane
BY
Griswold & Burdick
ATTORNEYS United States Patent Office 2,927,457
Patented Mar. 8, 1960

2,927,457

VISCOMETER

David J. Pye, Walnut Creek, and Robert A. Crane, Concord, Calif., assignors to The Dow Chemical Company, Midland, Mich., a corporation of Delaware Application December 20, 1956, Serial No. 629,507

2 Claims. (Cl. 73—59)

This invention relates to viscometers and particularly to a temperature compensated recording controlling viscometer adapted for use with high viscosity process streams.

The control of the viscosity of high polymer solutions is very important in processes for producing synthetic fibers. Variations in the viscosity of the polymer solution reaching the spinnerettes used in producing the synthetic fibers can result in pronounced variations in the diameter of the fiber, resulting in off-grade material. While the viscosity changes in a continuous polymerization process are rarely so rapid that viscosity measurements on spot samples cannot be used for control purposes, such methods are not entirely satisfactory due to sampling difficulties. Spot sampling for control purposes would be both difficult and time consuming when blending two streams of varying viscosity to produce a constant viscosity product.

In addition, since the viscosity of the polymer varies with temperature, a temperature correction factor must be applied to the apparent viscosity reading of samples of polymer in order to indicate the viscosity at a standard reference temperature.

Accordingly, a principal object of this invention is to provide an improved temperature compensated viscometer which is adapted for use with high viscosity process streams.

Viscometers made in accordance with this invention make use of the principle that the torque required to rotate a disc at a constant speed in a fluid is related to the viscosity of the fluid.

A viscometer instrument made in accordance with this invention comprises a rotating disc which is disposed in the fluid whose viscosity is to be measured, the planar surface of the disc being aligned with the direction of flow of the fluid. The disc is preferably driven by a rotatable worm which engages a worm gear at the upper end of a shaft attached to the disc. Endwise movement of the rotatable worm due to changes in thrust required to rotate the disc is applied to a strain gauge which converts the torque required to rotate the disc into an electrical output signal. The electrical output signal is coupled through suitable circuitry to a recording type self balancing potentiometer whose slidewire potential is controlled by thermistor elements which are used to sense the temperature of the fluid at the disc. The thermistors and an associated temperature control network are utilized to alter the slide wire potential so that the viscosity of the stream is indicated in accordance with a fixed reference temperature even though the fluid temperature varies above or below the reference temperature.

The invention, as well as additional objects and advantages thereof, will best be understood when the following detailed description is read in connection with the accompanying drawings, in which:

Fig. 3 is a side elevational view, on an enlarged scale, of the sliding worm shown in Figs. 1 and 2;

Fig. 4 is a simplified schematic electrical circuit diagram of a recording viscometer, and Fig. 5 is a schematic circuit diagram of the recording apparatus of the viscometer shown in Fig. 1.

Figure 2:
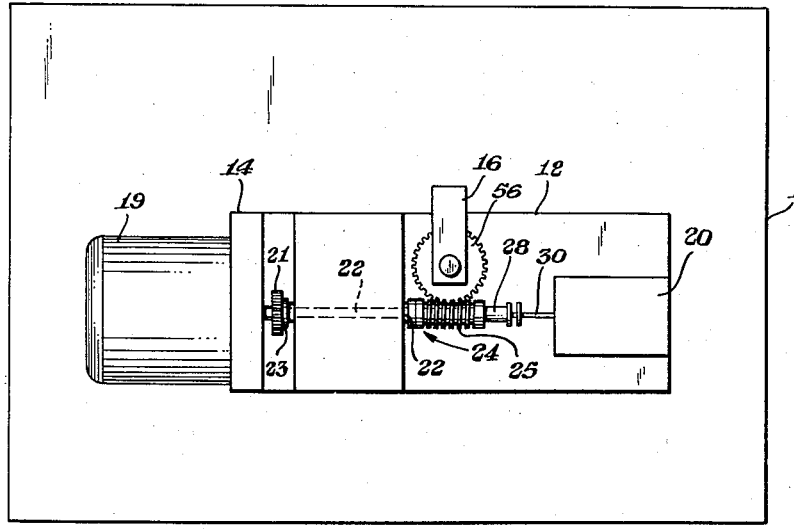
Fig. 2 is a plan view of the viscometer shown in Fig. 1.
Figure 1:
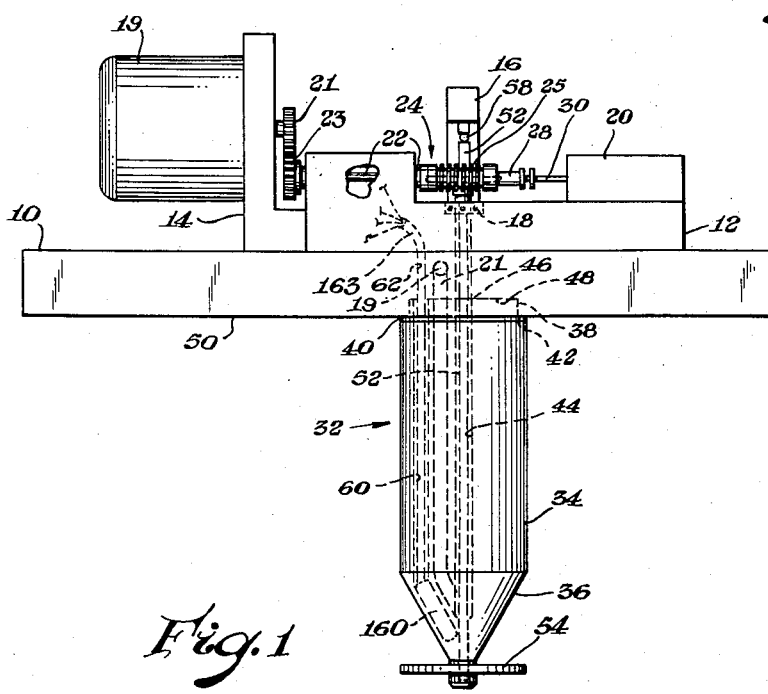
Fig. 1 is a side elevational view of a viscometer structure made in accordance with this invention.

Referring to Figs. 1 and 2, there is shown a block-like base plate 10 to which is fixedly attached a bearing block 12, motor mounting block 14, and a thrust bearing support block 16. A strain gauge 20 of the unbonded type is mounted on and secured to one end of the bearing block 12. A synchronous motor 19 is attached to the mounting block 14 and coupled by means of gears 21, 23 to the gear shaft 22 which passes through and is journalled in block 12 as shown. The shaft 22 is coupled through a torque transfer device, indicated generally by the numeral 24 to one end of a rotatable worm 25. The other end of the rotatable worm contains a ball pivot bearing 26 (see Fig. 3 for details of worm and torque transfer device) into which extends a pivot 28 which is attached to the end of the armature 30 of the strain gauge 20. (The armature 30 is, in effect, spring loaded by means of tightly stretched resistance elements in the strain gauge. Thus the pivot 28 is held against the worm 25.)

A disc support member, indicated generally by the numeral 32, having a generally cylindrically shaped solid body section 34, a frusto-conical lower end section 36, and an upper end section 38 of lesser diameter than the diameter of the body section, is provided. A gasket 40 fits over the upper end section 38 and rests on the planar shoulder 42 at the upper end of the body section. An axially disposed bore 44 extends through the lower end section 36, body section 34 and upper end section 38 of the disc support member 32. The bore 44 is counterbored as shown from a point about half way through the lower end section to the upper end of the disc support member.

A bore 46 extends through the base plate 10 and bearing block 12 and is counterbored at its lower end to the diameter of the upper end section 38 of the disc support member 32. The disc support member 32 is bolted into the counterbore 48 at the lower end of the bore 46, the gasket 40 making a fluid tight seal between the disc support member 32 and the lower side 50 of the base plate 10. A polymer leak path, comprising the small laterally extending bore 19 and a vertical bore 21 which communicates with the counterbore 48, is provided in order to prevent the buildup of excessive polymer in the bore 46.

A shaft 52, conveniently made of stainless steel or other material which is unaffected by the fluid to which the shaft 52 may be exposed, extends through the bore 44 in the disc support member 32 and through the bore 46 in the base plate 10 and bearing block 12. The lower end of the shaft 52 is of smaller diameter than the diameter of the remainder of the shaft 52 in order to permit the lower end to extend through the bearing part of the bore 44 which is of reduced diameter (that is, in the lower end section 36 of the disc support member 32). A circular disc 54, made of lucite, for example, and disposed perpendicularly with respect to the longitudinal axis of the shaft 52, is affixed to the lower end of the shaft 52 which extends beyond the lower end section 36 of the disc support member 32.

The upper end of the shaft 52 extends at least as high above the bearing plate 12 as does the worm gear 25. The shaft 52 is laterally supported at the top of the bearing block 12 by a ball bearing 18 which is secured to the block 12. A coupling element, such as worm gear 56, is attached to the shaft 52 above the bearing 18 and is disposed perpendicularly with respect to the longitudinal axis of the shaft 52, the teeth of the gear engaging with the flight of the worm gear 25. A ball bearing 58 is disposed between the upper end of the shaft 52 and the transversely extending arm of the thrust bearing support block 16. The upper end of the shaft 52 and the transverse arm of the thrust bearing support block 16 each contain a depression (not shown) adapted to retain the ball bearing 58 in operative position between the two above mentioned elements.

The disc support member 32 contains a second bore 60 which extends from the upper end thereof to near the lower end thereof, terminating as close to the disc 54 as is practicable while staying within the body of the disc support member 32. A pair of temperature sensitive devices or elements, thermistors, for example, are disposed at the lower end of the bore 60, the electrical leads thereto extending upwardly through a bore 62 in the base plate 10 and bearing block 12 and thence to a temperature compensation network which will be described later.

The torque transfer device 24, as best seen in Fig. 3, includes a worm 25, a ball pivot bearing 26 in one end of the worm body, a single drive pin 64 extending from and attached to the other end of the worm body, and a clearance bore 72 in the coupling 68 on the drive shaft 22. The worm body is adapted to slide end-wise on drive shaft 22 and is coupled to the drive shaft 22 by a coupler 68. This is secured to the end of the drive shaft 22 which faces the worm. From the end of the worm facing the coupler extends an eccentrically disposed drive pin 64. The coupler 68 has a cylindrically shaped body from which extend a pair of drive pins 70 and which contains a clearance bore 72 for drive pin 64. Clearance bores 66 are provided in the end of the worm 25 for the pins 70. The drive pins 70 and the drive pin 64 each extend through an aperture in a thin metal washer 74. When the drive pin of the worm 25 and the coupler 68 are so disposed, the pins 70 are aligned with the bores 66 and the pin 64 is aligned with the bore 72 in the coupler. The bores 66 and 72 are of larger diameter than the pins with which they are aligned and are deep enough to permit maximum deflection of the strain gauge without the ends of the pins 64 or 70 contacting the ends of the bores 66 or 72.

In operation, the worm 25 may be deflected linearly along the longitudinal axis of the shaft 22 as the worm 25 is driven by the shaft. This type of drive coupling has negligible friction and the worm 25 is free to move to correspond to small changes in reaction torque (or viscosity).

Fig. 4 shows the simplified basic electrical circuitry of a non-temperature compensated viscometer whose sensing element is coupled to a strain gauge. The four arms $a$, $b$, $c$, and $d$ of the strain gauge 20a are connected as in a simple Wheatstone bridge circuit. The full potential of the battery 80 is applied across the junction points 82 and 84 of the strain gauge 20a. The junction point 86 of the strain gauge is connected through a resistor 88 to the moveable contact 90 of a potentiometer 92 which is connected across the battery 80.

The output of the strain gauge appears between junction points 86 and 94. Junction point 94 is coupled through the lead 96 to one input circuit of a Brown high gain amplifier 98 (in effect a galvanometer). Another input to the Brown amplifier is coupled through the lead 100 to the moveable contact 102 of a potentiometer 104. The potentiometer 104 is coupled across a resistance element 106 of a voltage divider, having three elements, the voltage divider being connected across the battery 80. Junction point 86 is connected to the lower end of potentiometer 104.

The output of the amplifier 98 is coupled to a motor 108 which controls the movement of the moveable contact 102 of the potentiometer 104. A recording pen or other indicator member (not shown) is usually coupled to the motor also.

In the operation of the simplified circuit, any unbalance of the Wheatstone bridge circuit of the strain gauge 20a appears at the junction 94 and is coupled to the amplifier 98, producing an unbalance between the two inputs of the amplifier 98. The unbalanced inputs of the amplifier change the output of the amplifier 98 and cause the motor 108 to rotate, moving the arm 102 of the potentiometer 104 until the potential applied to the other input of the amplifier 98 is equal to but opposite in polarity to the bridge "unbalancing" potential. Thus, when the amplifier inputs are "balanced" at zero net input voltage, the motor stops and the potentiometer arm remains at the potential balancing point.

Any further change in the output of the strain gauge bridge causes corresponding changes in amplifier input and in the potentiometer arm setting.

Fig. 5 shows in more complete form the circuitry associated with the apparatus shown in Figs. 1, 2, and 3.

In Fig. 5 the potential source 110 corresponding to the battery 80 in Fig. 4 is an alternating current transformer 112 whose secondary winding is coupled to a bridge type rectifier 114. The output of the rectifier 114 is filtered and coupled across a potentiometer 116 in Fig. 5.

The strain gauge 20b is coupled across the potential source 110 at the junction points 118, 120. A third junction point 122 is connected to the moving arm 124 of the potentiometer 116 through a resistance 126. A thermistor 125, resistor 127, and resistor 129 are coupled across the potentiometer 116. The junction point 122 is connected between the thermistor 125 and resistor 127. The thermistor and resistors are used to provide zero drift compensation to the circuit so the zero setting on the scale will not change with recorder temperature. A potentiometer 128 and condenser 130 are coupled, in parallel, between junction points 132 and 122 on the strain gauge bridge. A movable contact arm 134 of the potentiometer 128 is connected to one input of a high gain Brown type amplifier (for example, Type 356410-1 or Type 353170-18 Brown amplifier made by the Industrial Div., Minneapolis Honeywell Regulator Co., Wayne and Windrim Avenues, Philadelphia 44, Pennsylvania).

A filter comprising a series resistor 136 and a shunt connected condenser 138 is provided and may be switched into the circuit between the moving arm 134 of the potentiometer 128 and the series input resistor 140 of the amplifier 142. Alternatively, the filter may be by-passed by means of switches 142, 144.

The second input to the amplifier 142 is connected to the moveable contact arm 144 of a potentiometer 146 which corresponds to the potential balancing potentiometer 104 in Fig. 4. A condenser 148, used as an alternating current filter, is connected between the two inputs to the amplifier 142.

The potential balancing potentiometer 146 is coupled through a temperature compensation network, indicated generally by the numeral 150, which is coupled across the center resistor 152 of a voltage divider comprising three resistances 152, 154, 156 which are connected in series. The voltage divider is coupled across the potential source 110. The junction point 122 of the strain gauge 20b is connected between resistors 152 and 156. The resistance 152 corresponds to the resistance 106 of the voltage divider of Fig. 4.

The output of the amplifier 142 in Fig. 5 is coupled to a motor 158 which moves the arm 144 of the potentiometer 146 in the same manner as described in connection with the motor 108 in Fig. 4.

The temperature compensation network 150 comprises a series of fixed resistance elements and temperature sensitive resistive elements 160, 162 (thermistors) which change resistance with a change in their temperature. In the network 150 the thermistors 160 and 162 and the fixed resistance elements (of suitable values) are connected to provide the desired resistance change (with temperature) across the network in order to compensate for changes in viscosity reading corresponding to temperature changes of the polymer impinging on the disc 54. The thermistor elements 160, 162 are connected to the rest of the temperature compensation network by means of leads 163 (see Fig. 2).

In operation, the disc 54 is disposed in the fluid whose viscosity is to be measured and rotated at a constant velocity by the synchronous motor 19 which is coupled through the gears 21 and 23 and worm 25, to the shaft 52. The amount of torque required to rotate the disc 54, however, is a function of the viscosity of the fluid impinging on the disc 54. A change in the torque required to rotate the shaft 52 to which the disc 54 is attached results in an axial displacement of the worm 25 because the shaft 52, which is structurally rigid, is prevented from being displaced laterally by the bearings at or near to each end of the shaft 52. (The bore 44 fits closely around the shaft 52 at the bottom of the disc support member 32 and acts as a bearing. The ball bearing 58 restricts the longitudinal movement of the upper end of the shaft 52 and bearing 18 restricts the lateral movement.)

The worm 25, as mentioned before, may easily be axially displaced due to the manner in which it is coupled between the gear reduction drive shaft 22 and the armature 30 of the strain gauge 20. Axial displacement of the worm due to a change in the torque required to rotate the shaft 52 at constant velocity actuates the armature and thus causes an un-balance in the output of the wheatstone bridge connected resistance elements of the strain gauge 20. The output of the wheatstone bridge circuit of the strain gauge 20 is, as described heretofore, coupled to a Brown type amplifier which drives a motor to which is coupled an indicator and the moveable contact of a potential balancing potentiometer.

Since the viscosity of the fluid being tested changes, for example, 5 percent per degree C. of temperature change, the temperature compensation network 150 is utilized to vary the potential applied across the potentiometer 146 to insure that the balancing point (viscosity indicating points) of the moveable arm 144 of the potentiometer is at the same point along the potentiometer element even though the temperature of the fluid being tested (and thus the apparent viscosity of the fluid) may vary over specified limits.

In order to filter "noise" from the output of the strain gauge, condensers of large capacitance are connected across the output of the strain gauge and across the two inputs to the Brown type amplifier. The "noise" occurs as a result of eccentricities of shafts or misalignment of mechanically movable parts of the apparatus which are coupled to the strain gauge.

It should also be mentioned that an additional resistance network could be inserted between the potentiometer 146 and the temperature compensation network 150 for the purpose of modifying the viscosity range which is measurable by the viscometer.

Although a transformer type power supply is used to energize the strain gauge, the filter condensers of the power supply are "brute force" filters of several thousands of microfarads. As a result, the output of the power supply is almost pure D.C.

What is claimed is:

1. A viscometer comprising a base member having a bore extending therethrough, a shaft supporting structure having a shaft bearing, said shaft supporting structure being secured to and extending below said base member, said shaft bearing being generally axially aligned with said bore, a rotatable shaft having a driven end and disc receiving end, said shaft extending through said bore and through said shaft bearing, a disc having parallel surfaces, said disc being secured to said shaft and having the parallel surfaces thereof disposed perpendicularly with respect to the longitudinal axis of said shaft, a driven end bearing, said driven end bearing being coupled to the driven end of said shaft, a gear, said gear encircling said shaft and being secured thereto, a constant speed drive means having an output element, a strain gauge having an armature arm and output signal terminals, said drive means and said strain gauge being secured to said base plate on opposite sides of said shaft, said output element and said armature arm being axially aligned, a worm, said worm being coupled to said gear, a two section coupling device, the sections of said device being axially movable with respect to each other during the operation of the coupling device, one section of the coupling device being connected to said output element and the other section of said coupling device being connected to said worm, the worm engaging with said first mentioned section and being coupled to said armature arm, and electrical indicator means for indicating axial movement of said worm as measured by the output signal of said strain gauge, said indicator means being electrically connected to the output signal terminals of said strain gauge.

2. A viscometer comprising a base member having an aperture, a rod-like rotatable shaft extending through said aperture and having a bearing end and a disc receiving end, a planar disc secured to the disc receiving end of said shaft, said disc being perpendicular to the longitudinal axis of said shaft and adapted to be disposed in a fluid whose viscosity is to be measured, a coupling gear, said coupling gear being secured to said shaft, a worm driving element, a drive shaft, said driving element being secured to said drive shaft and coupled to said coupling gear, the worm driving element being rotatable along its longitudinal axis, means for rotating said drive shaft, a strain gauge including a bridge circuit and having an electrical armature arm and output signal terminals, means for coupling the armature arm of said strain gauge to said driving element, a source of potential, said source of potential being coupled to opposite junction points of said bridge circuit, a temperature compensating resistance network, said network including a potentiometer having a moving arm and at least one thermistor element which is thermally coupled to said fluid whose viscosity is to be measured, said source of potential being coupled across said temperature compensating network, a servo amplifier having a pair of electrical input circuits and an electro-mechanical output, one of said input circuits being coupled to the output signal terminals of said strain gauge and the other of said input circuits being electrically coupled to said moving arm of said potentiometer, and said electro-mechanical output being mechanically coupled to said moving arm and to a viscosity indicating device.

References Cited in the file of this patent

UNITED STATES PATENTS

| | | |
|---|---|---|
| 1,106,865 | Dorr | Aug. 11, 1914 |
| 1,942,920 | Fawkes | Jan. 9, 1934 |
| 2,155,674 | Morgan et al. | Apr. 25, 1939 |
| 2,426,390 | De Forest | Aug. 26, 1947 |
| 2,573,286 | Statham et al. | Oct. 30, 1951 |
| 2,708,361 | Boyle et al. | May 7, 1955 |